(12) United States Patent
Entenmann

(10) Patent No.: US 6,409,230 B1
(45) Date of Patent: Jun. 25, 2002

(54) CINCH CLEAT AND METHOD OF UNIDIRECTIONAL AND BIDIRECTIONAL CINCHING THERETO

(76) Inventor: Guy J. Entenmann, 802 Bruce Ct., Apt. 2, Menomonie, WI (US) 54751

( * ) Notice: Subject to any disclaimer, the term of this patent is extended or adjusted under 35 U.S.C. 154(b) by 47 days.

(21) Appl. No.: 09/772,414

(22) Filed: Mar. 19, 2001

(51) Int. Cl.$^7$ .............................................. B65H 69/04
(52) U.S. Cl. ........................ 289/18.1; 289/1.2; 289/1.5; 24/129 R
(58) Field of Search .............................. 289/1.2, 1.5, 2, 289/4, 17, 18.1; 24/129 R, 130; 114/218; 410/96

(56) References Cited

U.S. PATENT DOCUMENTS

| | | | | |
|---|---|---|---|---|
| 18,107 A | * | 9/1857 | Seaman | ...................... 114/218 |
| 926,405 A | * | 6/1909 | Gould | ........................ 114/218 |
| 2,577,504 A | | 12/1951 | Barber | |

(List continued on next page.)

OTHER PUBLICATIONS

Encyclopedia of Knots and Fancy Ropework, R. Graumont and J. Hensel, pp. 521; 522; 523; 524; 612; and 613.

Primary Examiner—John D. Calvert
Assistant Examiner—Gary L. Welch
(74) Attorney, Agent, or Firm—Schroeder & Siegfried, P.A.

(57) ABSTRACT

A multipurpose cinch cleat and method of securing a line thereto with maximum simplicity, to prevent longitudinal movement of the line relative to the cleat in one direction, or if desired, in both directions. The cleat includes an elongated support having a cantilevered post with a free end extending outwardly therefrom, the support having opposite end portions which are fixedly mounted upon a supporting surface with the support being spaced from therefrom. Securing a line to the cleat includes passing the line around one side of the post to create opposing right and left-hand line segments; then passing one of the segments toward and around the support, and then around the opposite side of the post. The passed segment effectively becomes a tension line under load, restricting outward longitudinal movement, and the opposite segment becomes a take-up line which, when pulled, allows free longitudinal movement to take up slack in the tension line for tightening same. By repeating this process with the other segment, longitudinal movement of the strand can be prevented in both directions.

31 Claims, 7 Drawing Sheets

U.S. PATENT DOCUMENTS

| | | | |
|---|---|---|---|
| 2,962,992 A | * 12/1960 | Long | 114/28 |
| 3,126,858 A | * 3/1964 | Rosinski | 114/218 |
| 3,233,934 A | * 2/1966 | Osborn et al. | 114/218 |
| 3,257,971 A | 6/1966 | Swendsen | |
| 3,334,914 A | 8/1967 | Vierregger | |
| 3,678,543 A | 7/1972 | Hobbs | |
| D227,217 S | 6/1973 | Pick | |
| 3,930,288 A | 1/1976 | Black | |
| 3,948,203 A | * 4/1976 | Matthews | 114/218 |
| 3,950,010 A | 4/1976 | Robertson | |
| 3,960,091 A | 6/1976 | Ehlert | |
| 4,072,113 A | 2/1978 | Thurston | |
| D253,992 S | 1/1980 | Nelson | |
| D255,419 S | 6/1980 | Hume | |
| 4,222,157 A | 9/1980 | Forman | |
| 4,227,286 A | 10/1980 | Holmberg | |
| 4,242,021 A | 12/1980 | Sloane | |
| 4,270,478 A | 6/1981 | Kafka | |
| 4,344,378 A | 8/1982 | Martin | |
| 4,354,445 A | 10/1982 | Kafka | |
| D287,097 S | 12/1986 | Nelson | |
| 4,685,500 A | 8/1987 | Silvia | |
| 4,738,216 A | * 4/1988 | Camarota et al. | 114/218 |
| 4,812,093 A | 3/1989 | Millar, Jr. | |
| D300,721 S | 4/1989 | Whitley, II | |
| D301,683 S | 6/1989 | Whitley, II | |
| 4,918,785 A | 4/1990 | Spinner | |
| D332,124 S | * 12/1992 | Cooper | D21/230 |
| 5,216,972 A | 6/1993 | Dufrene | |
| 5,220,709 A | 6/1993 | Boyland | |
| D338,182 S | * 8/1993 | Dupont | D12/162 |
| 5,269,050 A | 12/1993 | Yewer, Jr. | |
| D344,883 S | 3/1994 | Chuang | |
| 5,302,064 A | 4/1994 | Davis | |
| 5,364,211 A | 11/1994 | Lund | |
| 5,366,327 A | * 11/1994 | Nelson | 410/96 |
| 5,368,281 A | 11/1994 | Skyba | |
| 5,443,341 A | 8/1995 | Hamilton | |
| 5,477,800 A | 12/1995 | Lawrence | |
| 5,477,801 A | 12/1995 | Lawrence | |
| 5,519,921 A | 5/1996 | Templer, Jr. | |
| D373,104 S | * 8/1996 | Miller et al. | D12/162 |
| 5,546,639 A | 8/1996 | Lacore | |
| 5,577,299 A | 11/1996 | Thompson | |
| D377,076 S | 12/1996 | Adams | |
| 5,615,631 A | * 4/1997 | Miller et al. | 114/218 |
| D382,793 S | 8/1997 | Wilcox | |
| 5,676,508 A | * 10/1997 | Weicht | 114/218 |
| 5,693,060 A | 12/1997 | Martin | |
| 5,738,471 A | 4/1998 | Zentner | |
| 5,772,371 A | 6/1998 | Ackerman | |
| 5,839,385 A | 11/1998 | Hersh | |
| D406,523 S | 3/1999 | Manthel | |
| 5,915,900 A | 6/1999 | Boltz | |
| 6,009,824 A | 1/2000 | Ross | |
| 6,012,204 A | 1/2000 | Roethler | |
| 6,030,007 A | 2/2000 | Bassily | |
| 6,039,520 A | 3/2000 | Cheng | |
| 6,059,498 A | 5/2000 | Ostrowski | |
| 6,113,328 A | 9/2000 | Claucherty | |

\* cited by examiner

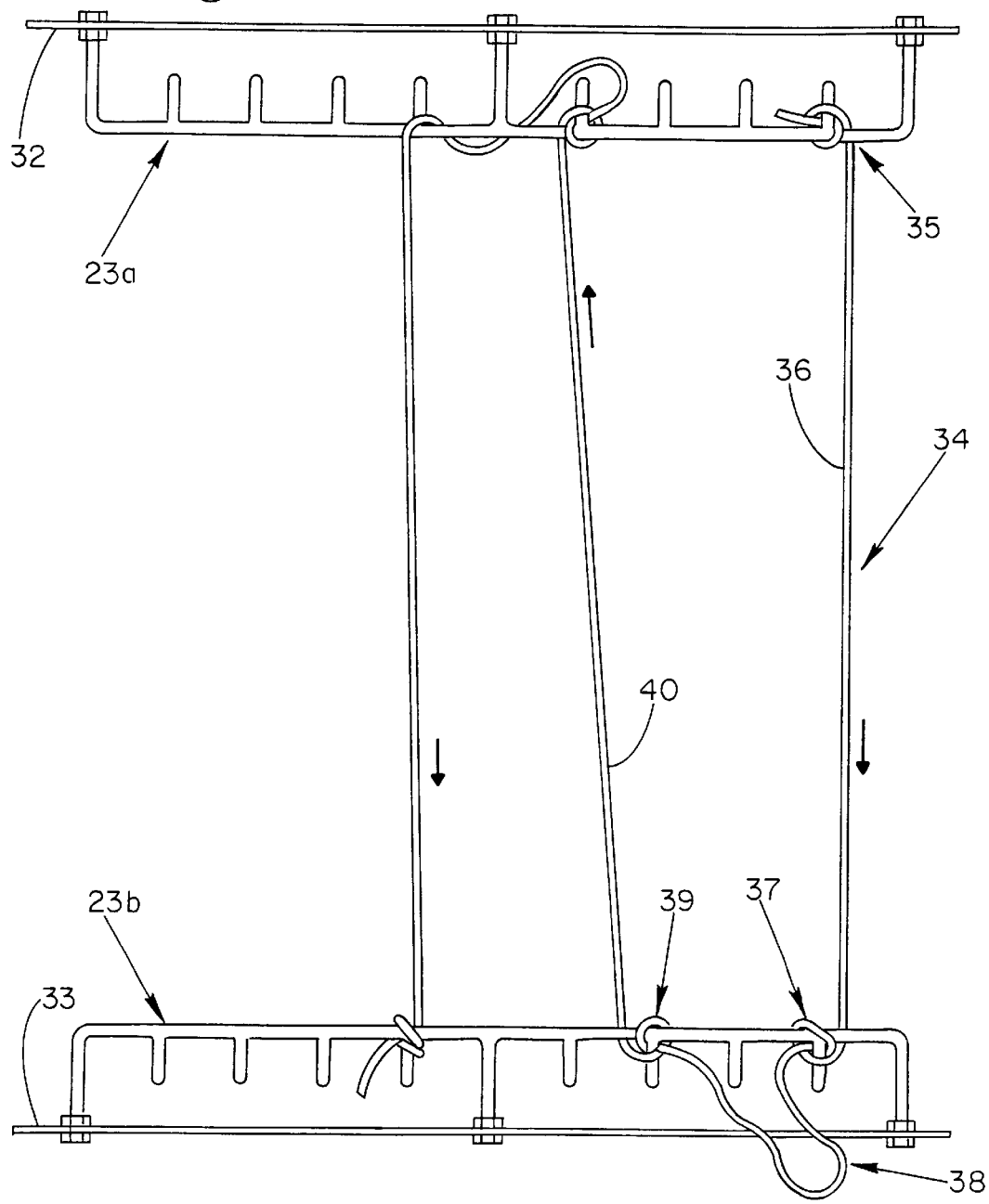

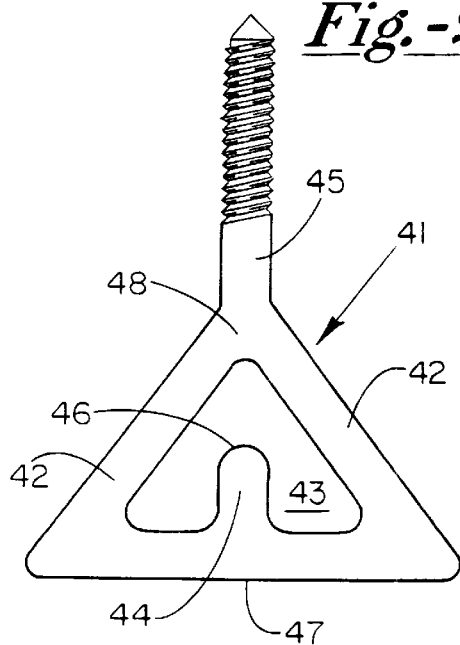
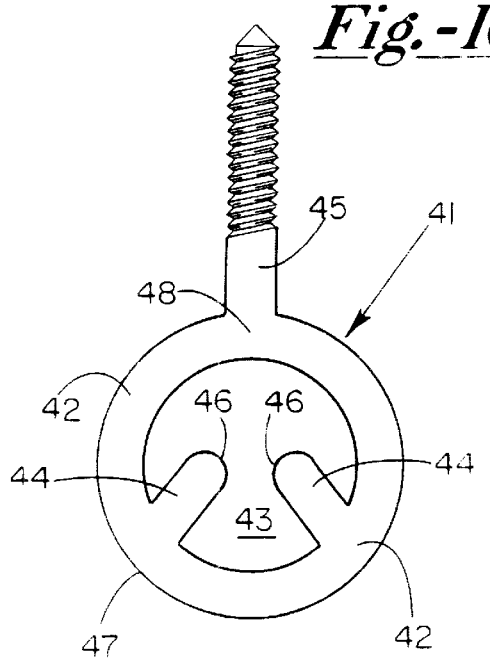
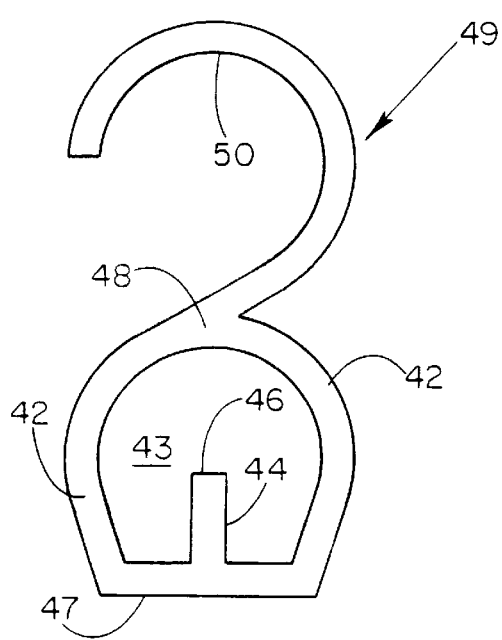

CINCH CLEAT AND METHOD OF UNIDIRECTIONAL AND BIDIRECTIONAL CINCHING THERETO

BACKGROUND OF THE INVENTION

The present invention is related generally to the art of knot tying, and more particularly to an improved multipurpose cinch cleat and method of securing a line thereto for unidirectional or bidirectional cinching of the line.

Anchoring devices or cleats have long since been commonly used in connection with many industrial and domestic applications to help secure cargo and the like in a desired fixed position so as to prevent movement thereof. Traditionally, a variety of cinching lines, such as ropes, straps, and elastic cords have been utilized with such cleats to secure the load in place. In more recent years, however, a variety of more sophisticated devices, such as cam buckle straps and ratchet straps have been developed for use in connection with such cleats to help aid in securing the load. While such devices have proved to be effective cinching devices, they suffer from the disadvantages of being more complicated to manufacture and operate, more expensive, and more bulky and difficult to store when not in use. For this reason, more conventional and less expensive cinching lines, such as rope, continue to be widely used for purposes of securing cargo and other loads.

There are a number of disadvantages, however, incident to the use of the more conventional cleats and cinching lines. For instance, oftentimes such cleats are designed in the form of an eyebolt having a central opening through which one end of the cinching line must be threaded to facilitate tying of a knot or otherwise securing the same thereto. This generally requires the cinching line to be cut to a predetermined length, so as to avoid unnecessary continuous threating of long lengths of line through the eyebolt. Thus, one is faced with either cutting the line to length and limiting its potential reuse on larger cargo, or persisting with the cumbersome and undesirable task of having to thread long lengths of line through the eyebolt of the cleat before passing the line to another cleat.

Other known cleats do not use an eyebolt configuration, but rather provide an anchoring device having outwardly extending arms to which a cinching line may be tied or otherwise secured in place. Such cleats are typically designed only to accommodate a single cinch line or knot, and any additional lines tied to the same cleat generally requires stacking of one knot on top of another. Such commingling of knots on a single cleat makes it extremely difficult to access and adjust the lower knots, when necessary. Moreover, the type of knots generally used in connection with such cleats are fixed knots which do not readily accommodate adjustment once affixed to the cleat. All of the foregoing problems cause substantial frustration when, as oftentimes happens, the cargo or load being secured will shift causing undesirable slack in the cinching lines, and the consequent need to untie or loosen such fixed knots in order to tighten the line.

For all of the foregoing reasons, it is apparent that there is a distinct need for an improved cinch cleat which can be economically manufactured and utilized with conventional, less expensive, cinching lines, and which will accommodate cinching of a line at any intermediate position along the length thereof, thus avoiding the undesirable task of threading long lengths of line through the cleat, or the need to cut the same into multiple shorter lengths. Moreover, it is also apparent that it would be desirable to tie a cinching knot to such a cleat which is readily adjustable, so as to take up slack in the line as necessary, and avoid undesirable dislodgment of the cargo or other load being secured. It is with these objectives in mind that I have developed my improved cinch cleat and method of cinching a line thereto, which provides the above benefits, and can be efficiently and inexpensively produced in a single or multiple cleat form so as to avoid undesirable stacking of multiple knots on a single cleat.

BRIEF SUMMARY OF THE INVENTION

In accordance with the present invention, I have developed an improved multipurpose cinch cleat and method of securing a line thereto with maximum simplicity, to prevent longitudinal movement of the line relative to the cleat in one direction, or if desired, in both directions. The cleat may be produced with single or multiple cinch points, and is characterized by an elongated support member having at least one cantilevered post with a terminating free end extending outwardly therefrom in non-aligned relation thereto. The elongated support member carrying the post is fixedly mounted upon a supporting surface, with the support and post being spaced from the supporting surface so as to allow sufficient room for the line to pass therebetween. Preferably, the support and post are sufficiently spaced from the supporting surface such that the distance between the terminating end of the post and the supporting surface is at least as great as a minimum cross-sectional dimension of the cinching line being used. While the general shape and configuration of my improved cleat may take many forms, in the preferred form of my invention, the support member and post have a generally circular cross section, and the opposite ends of the support member extend outwardly therefrom in a manner as to be fixedly mounted to a supporting surface.

With the cinch cleat so constructed, there is no need to cut the cinch line into shorter specific lengths, as securing any one or more items in place can be accomplished with a single continuous length of line. In the manner as taught by the present invention, securing such a line to my improved cinch cleat includes forming a bend in the line and passing the bent portion of the line between the terminating end of the post and the supporting surface. The line is then passed around the post such that the intrados surface of the bent line engages the back side of the post. By passing the line in this manner, opposing right and left-hand line segments are formed which extend outwardly from opposite sides of the post.

Completing a unidirectional cinch knot depends upon which line segment is to be utilized to secure the cargo or load. By way of example, assuming the right-hand segment is to be used to secure the load, the right-hand segment is then passed toward and around the support, and then around the front side of the post. By passing the right-hand segment in this manner, it passes back over the line itself at the juncture of the support and post, and wedges the line against support and post. Thus, the right-hand segment effectively becomes a tension line under load, and restricts outward longitudinal movement of the line in that direction. The left-hand segment, however, effectively becomes a take-up line which, when pulled, allows free longitudinal movement of the line to take up slack in the right-hand segment for tightening same. Thus, with the right-hand segment securing the load, it may be effectively tightened by simply pulling on the left-hand segment to increase tension therein and further restrict outward longitudinal line movement.

In a similar manner, should the left-hand segment be used to secure a load, passing the left-hand segment toward and around the support, and then around the bent side of the post will similarly cause such segment to pinch the line against the juncture of the support and post so as to restrict outward longitudinal movement thereof. In this embodiment, the left-hand segment effectively becomes the tension line under load, and the right-hand segment becomes the take-up line which, when pulled, allows free longitudinal movement to take up slack in the left-hand segment for tightening same.

Notably, the line segment being passed toward and around the support member may do so on either side of the post, and still function adequately as a tension line. If passed on one side, it will simply cross over itself before passing around the front side of the post, and if passed on the other side, it will cross over the other line segment before passing around the front side of the post. In either case, the line segment being passed will function as a tension line restricting outward longitudinal line movement. In the preferred embodiment, however, it is contemplated that the segment being passed will first cross over the opposite segment prior to being passed around the front side of the post.

Should it be desired to form a bidirectional cinch knot, where both left and right-hand line segments form a tension line incapable of longitudinal outward movement, both segments may be passed toward and around the support member and then around the front side of the post, effectively causing both line segments to wedge the line against the support and post, thereby restricting movement in either direction. In tying this knot, the order in which each segment is passed does not matter.

In an alternative embodiment of my invention, my improved cinch cleat may carry multiple posts so as to allow the user to tie multiple knots to the same cleat without stacking or otherwise commingling the knots at a single location. By spacing the posts longitudinally along the support member, each post defines a separate cinch point at which one of the above described knots may be tied, thus separating adjacent knots for independent adjustment, as needed. In one particular embodiment, it is conceivable that a cinch line may be tied to a pair of adjacently spaced posts on the same cleat, such that the segment of line extending between the adjacent posts constitutes the take-up line for both knots, thereby effectively creating a "take-up loop" between the adjacent posts for adjusting the tension of the remaining line segments, which are used to secure the load.

As can be seen from the above, there are numerous applications for which my improved multipurpose cinch cleat and securing method may be used. No longer is it necessary to thread long continuums of line through eyelets as with traditional cleats, or stack multiple knots on a single cleat, making it difficult to access the same. By cinching a line to my improved cleat in the manner described above, all of the stated problems and frustrations incident to the use of traditional cleats may be avoided. In addition to the above, the construction of my improved cinch cleat is extremely simple, as it constitutes a one-piece design that ensures durability and longevity of the cleat, and has the functional capability, if desired, of multiple conventional cleats. Thus, many anchor points are effectively provided with fewer cleat mounting points, thereby requiring fewer mounting holes and less installation time.

BRIEF DESCRIPTION OF THE DRAWINGS

FIG. 7 is a side elevational view of an alternative embodiment of the improved cinch cleat shown in FIG. 1, having multiple cinch points to which a unidirectional or bidirectional cinching knot may be tied in accordance with the principals of my invention;

FIG. 8 is a top plan view of a pair of multi-point cinch cleats constructed in accordance with the principals of my invention, illustrating the manner in which a load may be secured using only a single continuous length of cinch line and multiple spaced unidirectional cinch knots;

FIG. 9 is a side elevational view of another alternative embodiment of an improved cinch cleat constructed in accordance with my invention, wherein the cleat has a continuous triangular shape;

FIG. 10 is a side elevational view of still another alternative embodiment of an improved cinch cleat constructed in accordance with my invention, wherein the cleat has a continuous circular shape; and FIG. 11 is a side elevational view of yet another alternative embodiment of an improved cinch cleat constructed in accordance with my invention, wherein the cleat is constructed with a releasable mounting member.

DETAILED DESCRIPTION OF THE INVENTION

Figure 1:
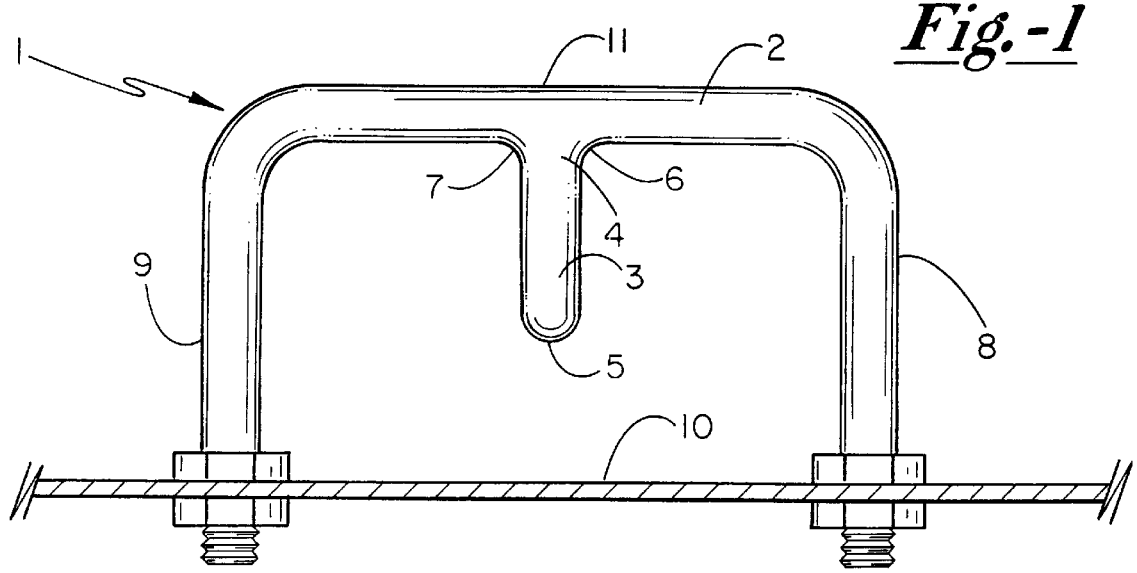
FIG. 1 is a side elevational view on an improved multipurpose cinch cleat constructed in accordance with the principals of my invention, shown mounted to a supporting surface, which is depicted in cross section.

The present invention, as described herein, includes an improved multipurpose cinch cleat and method of securing a line thereto for unidirectional or bidirectional cinching of a line. While the cinch cleat of the present invention may take on a number of configurations, the preferred form of such cleat is shown in FIG. 1. As shown therein, my improved cinch cleat 1 includes an elongated support member 2 with an intermediately disposed post 3 extending outwardly therefrom. Post 3 is cantilevered by one end 4 to support member 2, and has an opposite terminating free end 5 which is unobstructed and devoid of connection to any structure. Notably, cantilevered end 4 of post 3 forms junctions 6 and 7 with support member 2, and support member 2 extends outwardly from junctions 6 and 7 in opposite directions toward legs 8 and 9 of cleat 1. Legs 8 and 9 are connected to opposite ends of support member 2 and extend outwardly therefrom toward supporting surface 10. Legs 8 and 9 may be bolted or otherwise fixedly mounted to surface 10 by any appropriate means, depending on the nature of surface 10. Conceivably, legs 8 and 9 could even constitute stakes that are driven into a ground surface for supporting such a cleat 1 for cinching purposes.

As shown in FIG. 1, the elongated support member 2 carrying post 3 is fixedly mounted to supporting surface 10 in such a manner that support member 2 and post 3 are sufficiently spaced from supporting surface 10 to provide for passage of a cinch line therebetween. Preferably, the distance between the terminating end 5 of post 3 and the supporting surface 10 is at least as great as the minimum cross-sectional dimension of a cinching line to be used therewith.

In addition to the above, as will become more apparent hereafter, it is also preferable that post 3 extend outwardly from supporting member 2 a distance greater than the cross-sectional dimension of the cinch line to be used therewith. This will help prevent the cinch line from slipping over post 3 upon tightening same. Thus, depending upon the spacing between post 3 and surface 10, and the relative dimensions of cleat 1, including post 3, it is conceivable that a number of different types and sizes of cinch lines may be used in the manner described and taught herein.

Although FIG. 1 shows cleat 1 mounted in an upright position, with post 3 depending downwardly therefrom, it is noted that cleat 1 may be readily mounted in any orientation, and on any surface, provided such surface is capable of supporting cleat 1 for its intended purpose, and adequate access to cleat 1 is provided. Importantly, however, it is essential to note that although post 3 is shown depending downwardly from support member 2 toward surface 10, as will be appreciated hereafter, post 3 may extend outwardly from supporting member 2 in virtually any orientation, provided only that the surface 11 of support member 2, which lies opposite and adjacent post 3, remains free from obstruction so as to allow a cinch line to pass therearound in a manner to be described hereafter.

Figure 2A:
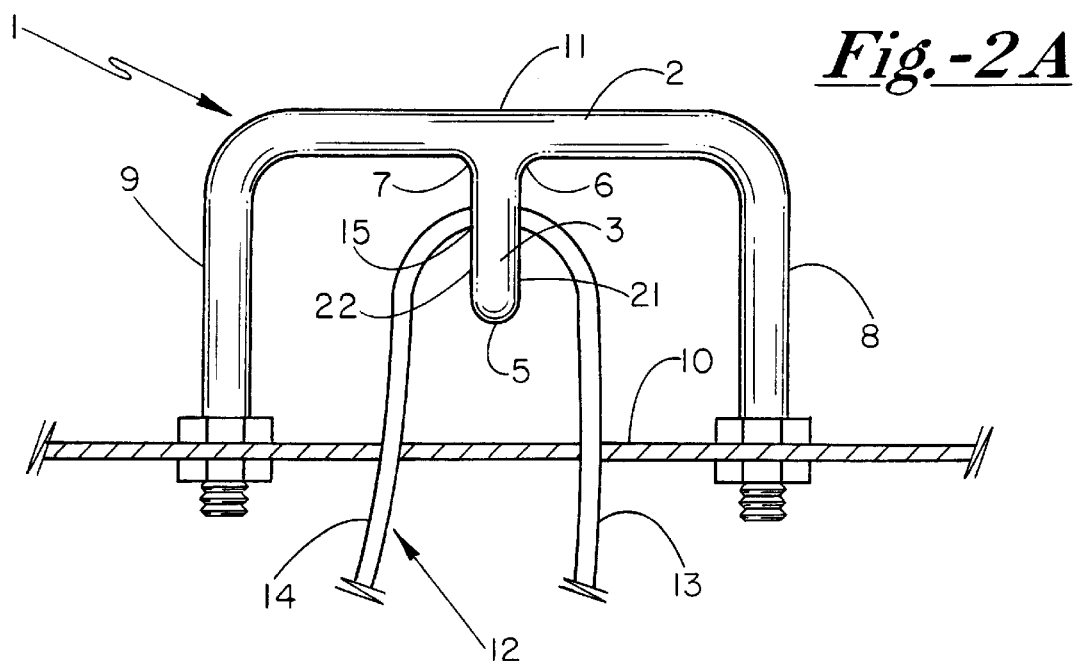
FIG. 2A is a side elevational view of the improved cinch cleat of FIG. 1, showing the initial step of forming a right-hand unidirectional cinching knot thereon in accordance with the principals of my invention.
Figure 2B:
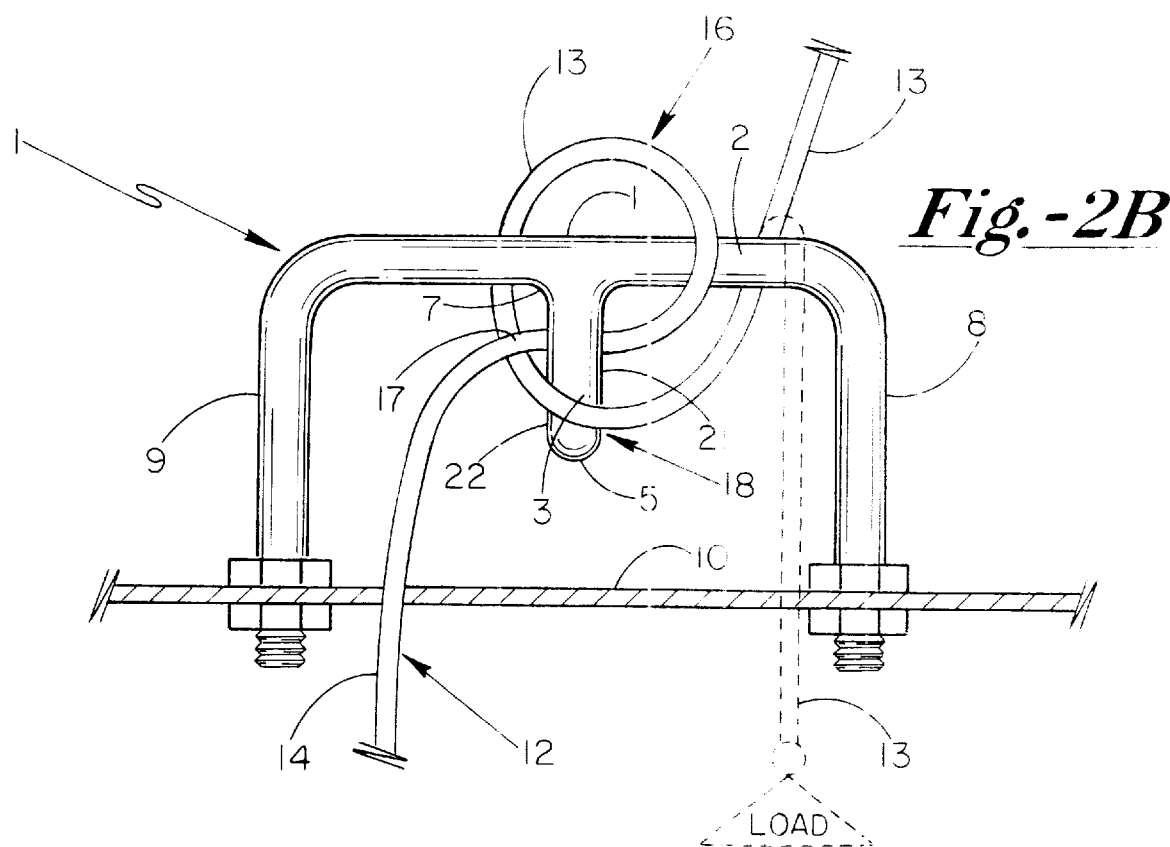
FIG. 2B is a side elevational view of the improved cinch cleat of FIG. 1, showing the remaining steps of forming a right-hand unidirectional cinching knot thereon in accordance with the principals of my invention.
Figure 2C:
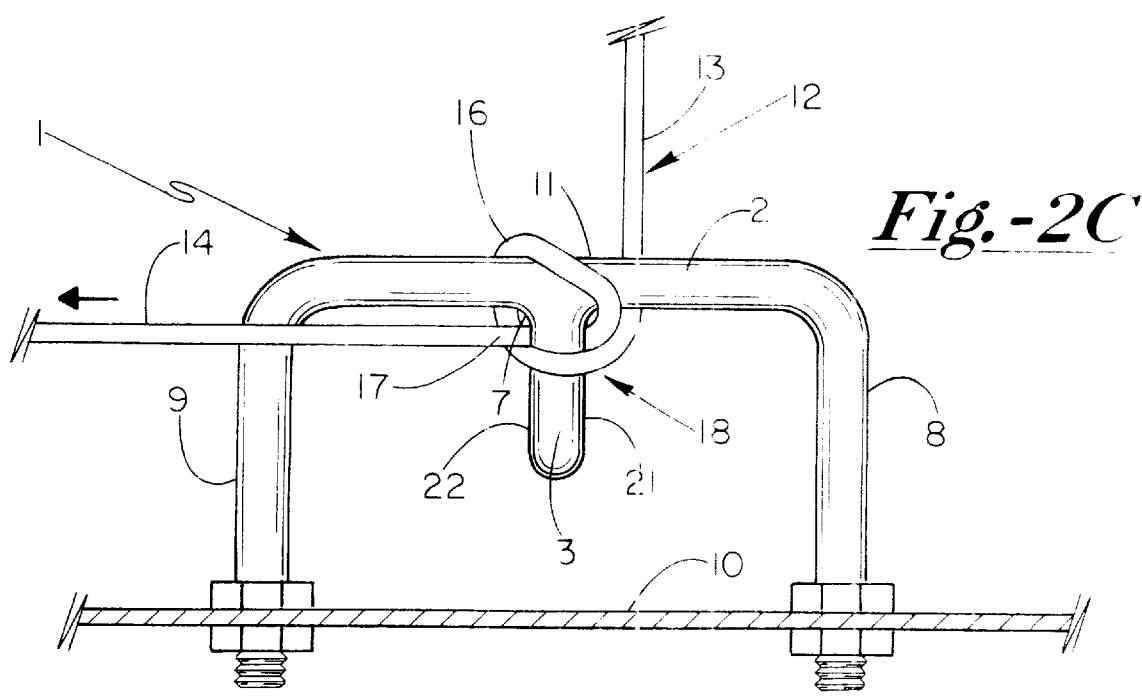
FIG. 2C is a side elevational view of the improved cinch cleat of FIG. 1, showing a completed right-hand unidirectional cinch knot tied thereto in accordance with the principals of my invention.

With the cleat so constructed, it will be appreciated that there is no need to cut a cinch line into shorter specific lengths, as securing any one or more items in place can be accomplished with a single continuous length of line used in combination with my improved multipurpose cinch cleat 1. Thus, in accordance with the present invention, one preferred method of right-hand unidirectional cinching to my improved cinch cleat 1 is shown in FIGS. 2A–2C. As shown in FIG. 2A, the initial step of cinching any given portion of the continuum of line 12 to cleat 1 involves passing line 12 around post 3. To accomplish this, line 12 is first bent near the desired cinching point, as shown in FIG. 2A, so as to provide opposite right and left-hand line segments 13 and 14, respectively. The bent portion of line 12 is then preferably passed between the terminating free end 5 of post 3 and mounting surface 10, and looped around post 3 such that the intrados surface 15 of line 12 bears against the back side of post 3.

As shown in FIG. 2B, if the right-hand segment 13 of line 12 is to constitute a tension line for securing cargo or supporting a load, then segment 13 is passed toward and around support member 2 as shown at point 16, and then back around the front side of post 3 in such a manner as to cross the opposing line segment 14 adjacent point 17 thereon. Notably, this is accomplished without threading the end of line 12 through cleat 1 by forming a loop of segment 13, as shown at point 18, and passing the looped portion 18 over the free end 5 of post 3 to the front side thereof. Having cinched line 12 to cleat 1 in this manner, as shown in FIG. 2C, any load or tension created on right-hand line segment 13 effectively causes segment 13 to wedge the left-hand line segment 14 against support member 2 and post 3 at the juncture 7 therebetween. Thus, right-hand line segment 13 pinches line 12 against cleat 1, thereby restricting any outward longitudinal movement of line 12 in the direction of segment 13.

With line 12 cinched to cleat 1 as described above, the left-hand line segment 14 effectively becomes a take-up line used for taking up slack and tightening tension line 13. As can be seen best in FIGS. 2B and 2C, the left-hand line segment 14 may be pulled through the wedge at juncture 7, thus drawing line 13 in and tightening same. Upon release of segment 14, the increased tension in line segment 13 will instantly re-cinch line 12 in locked position against the juncture 7 between support member 2 and post 3. To further aid in this process, pulling back on segment 13 toward cleat 1 will help loosen the cinch knot, making it easier to pull on the left-hand take-up line 14.

Notably, as shown best in FIGS. 2B and 2C, upon completion of cinching line 12 to cleat 1, the right and left-hand line segments 13 and 14 extend outwardly from cleat 1 in opposite directions. As a further alternative, however, and as shown in phantom in such drawings, the right-hand tension line 13 may be optionally passed back toward and around support member 2 so as to extend outwardly from cleat 1 in the same direction as the left-hand take-up line 14. In either configuration, the knot will work equally well, thereby providing maximum versatility with its use.

Figure 3A:
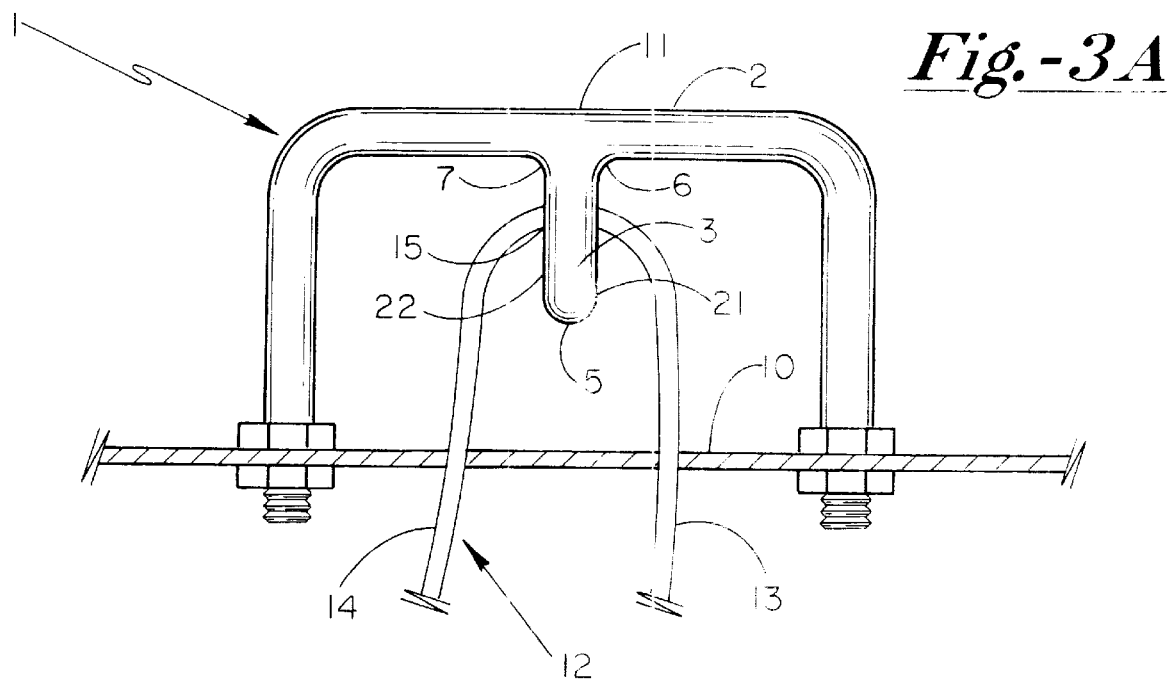
FIG. 3A is a side elevational view of the improved cinch cleat of FIG. 1, showing the initial step of forming a left-hand unidirectional cinching knot thereon in accordance with the principals of my invention.
Figure 3B:
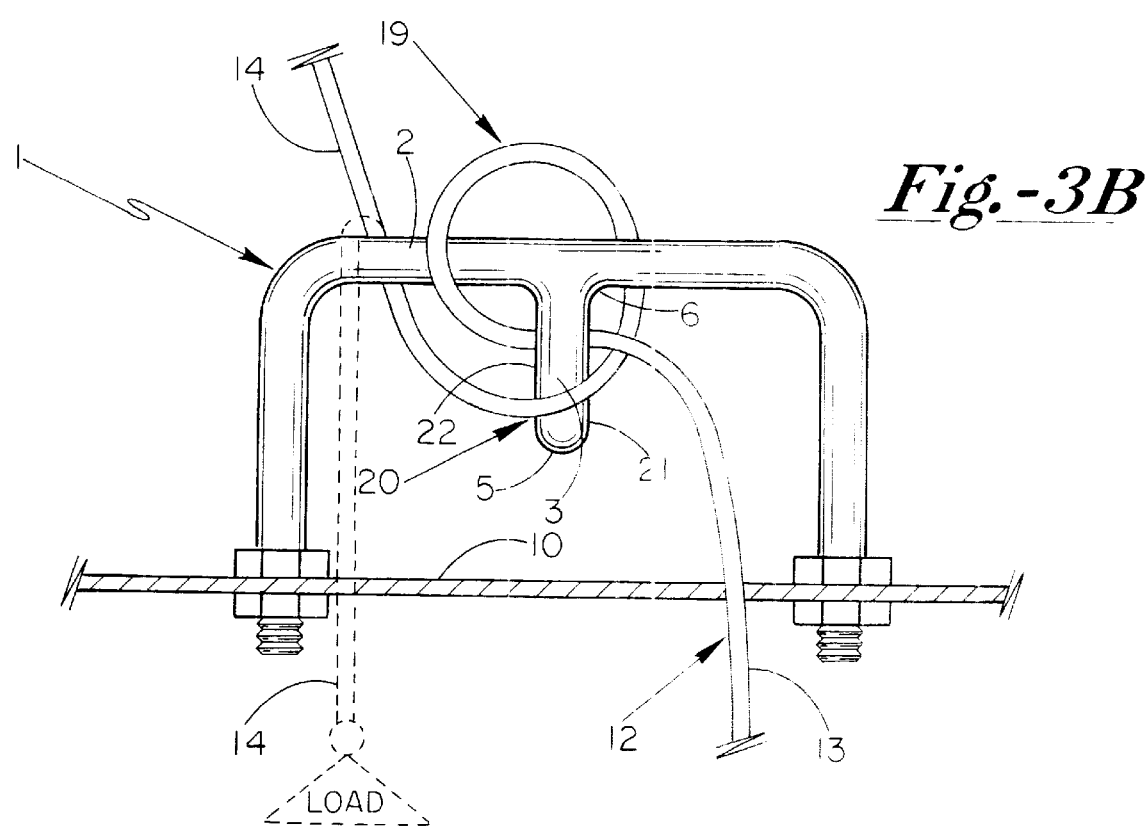
FIG. 3B is a side elevational view of the improved cinch cleat of FIG. 1, showing the remaining steps of forming a left-hand unidirectional cinching knot thereon in accordance with the principals of my invention.

From the forgoing discussion, it is evident that a left-hand unidirectional cinching knot may also be formed on cleat 1 by simply reversing the method described above. Thus, as shown in FIG. 3A, the portion of line 12 which is to be cinched to cleat 1 may again be bent and passed around post 3 as previously described. From this position, as shown in FIG. 3B, the left-hand line segment 14 may be passed toward and around support member 2 of cleat 1 as at point 19, and then back around the front side of post 3 in such a manner as to cross the right-hand line segment 13. Again, this may be accomplished without the need of threading the end of line 12 through cleat 1, as segment 14 may be similarly formed into a loop, as shown in point 20, and passed over the free end 5 of post 3 to the front side thereof. If it is desired to have both line segments 13 and 14 extending in the same direction, segment 14 may be passed back toward and around support member 2, as shown in phantom in FIG. 3B.

Figure 3C:
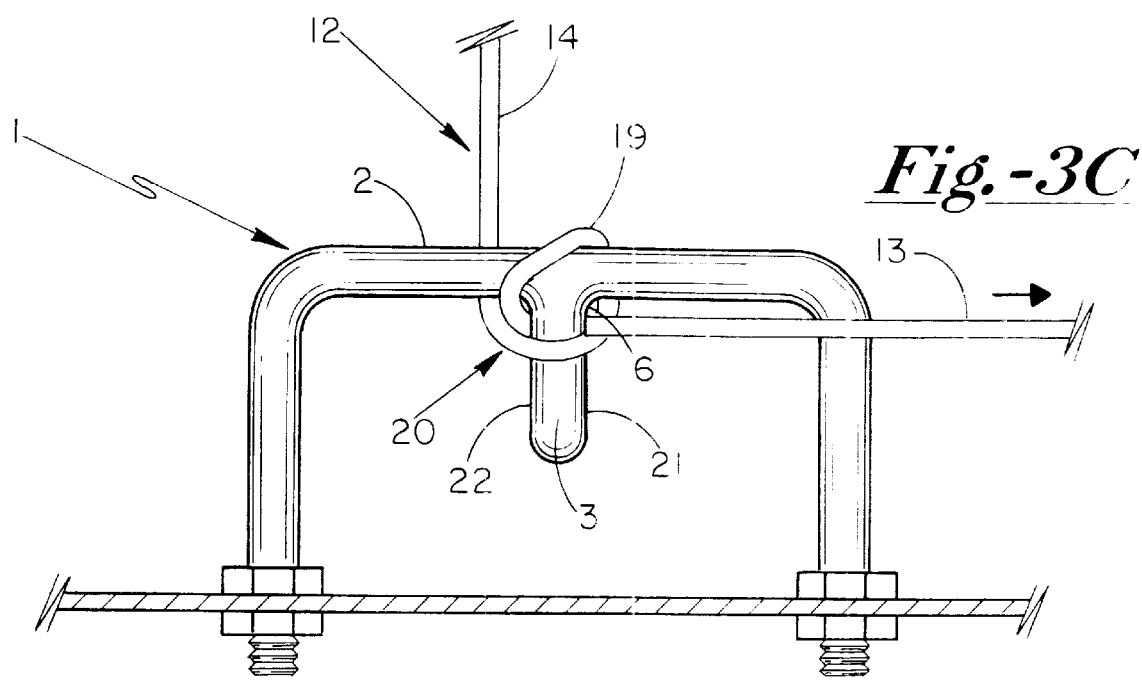
FIG. 3C is a side elevational view of the improved cinch cleat of FIG. 1, showing a completed left-hand unidirectional cinch knot tied thereto in accordance with the principals of my invention.

As shown in FIG. 3C, in this case, the left-hand line segment 14 effectively becomes a tension line which, under load, wedges the right-hand line segment 13 against post 3 and support member 2 at the juncture 6 therebetween. In so doing, line segment 14 is restricted from any longitudinal outward movement. Line segment 13, on the other hand, now functions as a take-up line which, when pulled, allows free longitudinal movement of line 12 so as to increase tension and tighten line segment 14 that is connected to a load.

Thus, as can be seen from FIGS. 2A–2C and FIGS. 3A–3C, either a right or left-hand unidirectional cinching knot may be tied to cleat 1 at any desired point along the continuum of line 12. Depending upon which segment 13 or 14 of continuous line 12 is to be used to secure a load, the appropriate unidirectional cinching knot may be tied with maximum simplicity, and without the need for specific predetermined lengths of line, as with many conventional anchoring devices.

With the use of the above unidirectional cinching knot, one does not have to worry about the tension line gaining slack during the tying of the knot, as the knot may be tied loosely and thereafter tightened by pulling on the take-up line. Thus, unlike many conventional fixed knots, there is no need to maintain tension on the load-bearing line during tying of the knot, as this can be effectively tightened at any time by simply pulling on the respective takeup line.

The simplicity of the knot is evident, which facilitates ease in undoing the knot when desired. Whether using a right-hand or left-hand cinching knot, the knot may be released from cleat 1 by simply pushing the looped portion 18 or 20 of the tension line back over the free end 5 of post 3. More specifically, for a right-hand unidirectional knot, as shown in FIG. 2C, looped portion 18 of tension line 13 may be pushed downward over free end 5 of post 3, thereby releasing the wedge against line segment 14 at juncture 7 and allowing free movement of line 12. Similarly, as shown in FIG. 3C, a left-hand unidirectional knot may be easily undone by pushing looped portion 20 of tension line 14 over free end 5 of post 3, thereby releasing the wedge against line segment 13 at juncture 6 between support member 2 and post 3.

The orientation of post 3 relative to the load being secured is also determinative of the ease by which the right or left-hand unidirectional knot may be released. If post 3 extends directly away from the load, as in FIG. 3C, pushing the tension line over the free end 5 of post 3 requires adding tension to the tension line, which may already be tightly drawn. However, should the load be offset from the longitudinal axis of post 3, undoing the tension line from post 3 becomes easier, as pushing the same over the free end 5 requires more lateral versus longitudinal line movement, thus placing less tension thereon.

Also, tying the knot to cleat 1 such that the load is positioned opposite that of the take-up line avoids the need to pass the tension line back toward and around the support member 2, as shown in phantom in FIGS. 2B and 3B. This also reduces the force required to release the tension line from post 3, as passing the line back over support member 2 further tightens the knot to cleat 1. Despite the relative ease by which line 12 may be released from cleat 1, additional aid in releasing either of the above knots may be provided by pulling on the tension line to release tension on the knot, and feeding the respective take-up line back through the knot in the reverse direction.

It is noted that with both the right-hand and left-hand unidirectional knots previously described, the line segment that constitutes the tension line is passed around the front side of post 3 starting from the opposite side from which it originated. In other words, with reference to FIGS. 2B and 2C, it can be seen that the tension line 13 originally extends outwardly along side 21 of post 3, but is passed over and around support member 2 of cleat 1 so as to cross line segment 14 before passing back around the front side of post 3 from the opposite side 22 thereof. Similarly, with reference to FIGS. 3B and 3C, tension line 14 originates on side 22 of post 3, and passes toward and around support member 2 so as to cross line segment 13 before passing back around post 3 from the opposite side 21 thereof.

Figure 4:
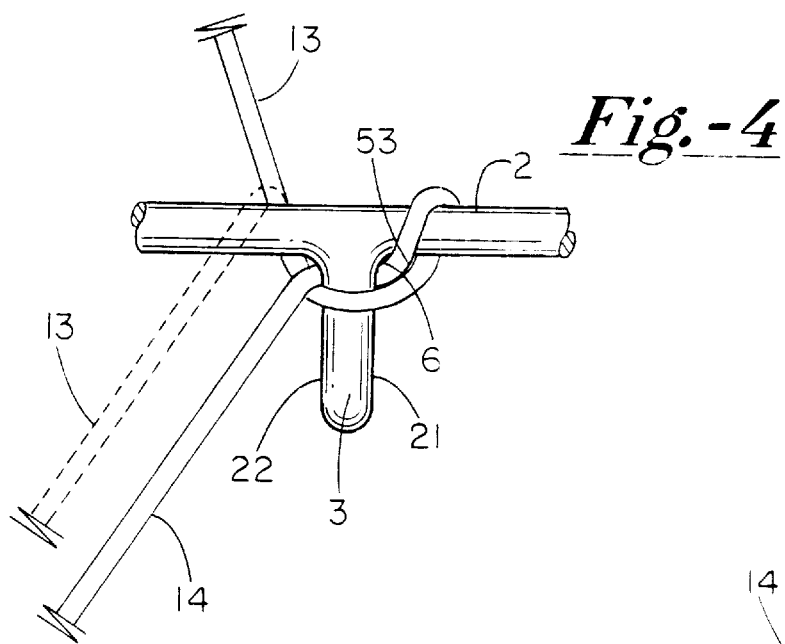
FIG. 4 is a side elevational view of the improved cinch cleat of FIG. 1, showing an alternative method for tying a right-hand unidirectional cinch knot thereto in accordance with the principals of my invention.

While the above describes the preferred manner of tying the right and left-hand unidirectional knots, it will be appreciated that the line segment being passed toward and around the support member 2 may do so on either side 21 or 22 of post 3, and still function adequately as a tension line. Thus, as shown in FIG. 4, for a right-hand unidirectional cinching knot, it is possible to pass the right-hand line segment 13 toward and around support member 2 on the same side 21 from which it originates, and then pass line segment 13 around the front side of post 3, from side 21 toward side 22 thereof. In this embodiment, the tension line segment 13 effectively wedges itself, at point 53, against the juncture 6 of support 2 and post 3. The left-hand line segment 14 continues to function as a take-up line which, when pulled, allows free longitudinal movement of line 12 to take up slack and tighten the right-hand segment 13. As in the preferred embodiment, line segment 13 may be passed back toward and around support member 2 (shown in phantom), if it is desired or required to have both line segments extend in the same direction.

Figure 5:
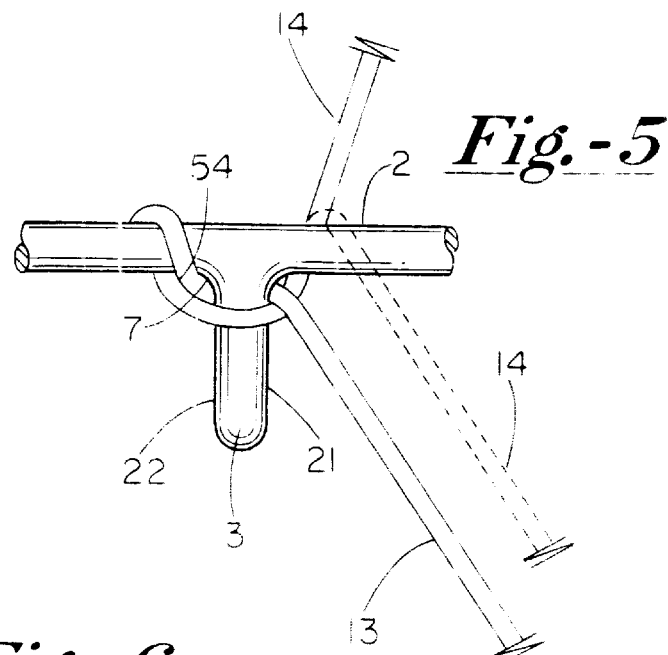
FIG. 5 is a side elevational view of the improved cinch cleat of FIG. 1, showing an alternative method for tying a left-hand unidirectional cinch knot thereto in accordance with the principals of my invention.

In a similar manner, as shown in FIG. 5, the left-hand unidirectional cinching knot may also be tied in the alternative manner described above. As can be seen in FIG. 5, in this embodiment, left-hand line segment 14 is passed toward and around support member 2 on the same side 22 from which it originated, and is then passed around the front side of post 3 from side 22 toward side 21 thereof. In this embodiment, applying a load to line segment 14 causes it to wedge against itself at point 54, thereby causing line segment 14 to function as a tension line, restricting outward longitudinal movement thereof. Again, in this embodiment, right-hand line segment 13 continues to function as a take-up line, whereby pulling the same will cause any slack in tension line 14 to be taken up, thus effectively tightening tension line 14 and further restricting outward longitudinal movement thereof. As shown in phantom, line segment 14 may also be passed back toward and around support member 2, should it be desired or necessary to have both line segments extend in the same direction.

While the above describes the method by which either a right or left-hand unidirectional cinch knot may be secured to my improved cinch cleat 1, it is also possible, utilizing the same method as described above, to tie a bidirectional cinch knot, wherein both the right and left-hand line segments 13 and 14 constitute tension lines incapable of outward longitudinal movement relative to the knot. In this embodiment, as shown in FIG. 6, both the right-hand line segment 13 and left-hand line segment 14 may be passed in a manner as previously described, thereby causing both lines to pinch against the other when a load is applied thereto.

Figure 6:
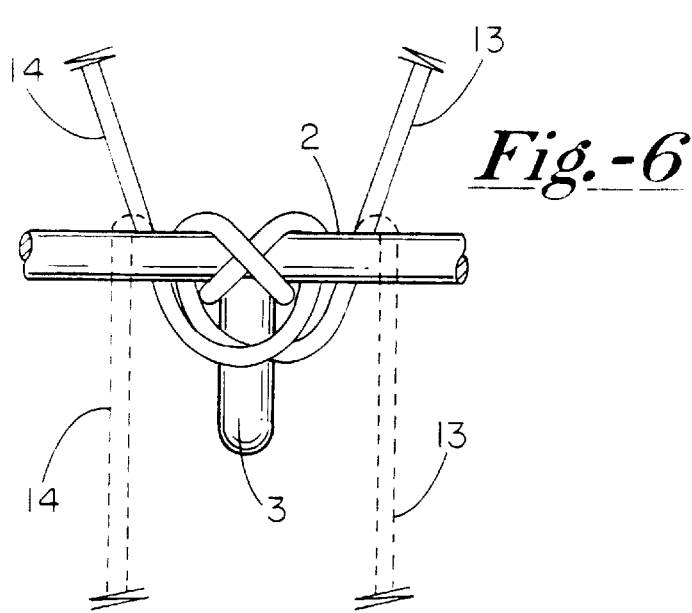
FIG. 6 is a side elevational view of the improved cinch cleat of FIG. 1, showing the method by which a bidirectional cinch knot may be tied thereto in accordance with the principals of my invention.

Although either line segment may be passed first, in the illustration shown in FIG. 6, the left-hand line segment 14 is first passed toward and around support member 2, and then around the front side of post 3, in such manner as to pinch against the right-hand line segment 13 when placed under tension. Then, the right-hand line segment 13 is also passed toward and around support member 2, and around the front side of post 3, in a manner as previously described. With both line segments being passed in such a manner, both the right and left-hand line segments 13 and 14 effectively become tension lines which, under load, restrict outward longitudinal movement thereof. Notably, it makes no difference which side of post 3 either line segment 13 or 14 is passed, as passing both line segments will always create a bidirectional cinch knot.

In a manner similar to that previously described, and as shown in phantom in FIG. 6, either or both of line segments 13 or 14 may also be passed back toward and around support member 2, should it be desired or necessary for such line segments to extend in the opposite direction. Also, releasing the bidirectional knot is accomplished in the same manner as previously described for each unidirectional knot, with the exception that now both line segments 13 and 14 must be pushed back over free end 5 of post 3.

Having described the basic preferred form of my improved cinch cleat and methods of unidirectional and bidirectional cinching thereto, reference is now made to FIG. 7, wherein an alternative embodiment of my improved cinch cleat having multiple cinch points in shown. As can be seen therein, the multi-point cinch cleat 23 includes an elongated support member 24 having longitudinally spaced legs 25, 26, and 27 extending outwardly therefrom to a supporting surface 28, to which such legs are fixedly secured in an appropriate conventional manner. Notably, in this embodiment, depending on the length of cleat 23, it is preferable to add at least one intermediate supporting leg 26 interposed between opposite ends of the cleat for added support thereto. Similar to the previously described cleat 1, legs 25, 26, and 27 of multi-point cinch cleat 23 also function to maintain the support member 24 and multiple outwardly extending posts 29 in spaced relation relative to the supporting surface 28.

As can be seen in FIG. 7, posts 29 having unobstructed free ends 30 are cantilevered from support member 24 in longitudinally spaced relation along the length thereof. Each post 29 extends outwardly from support member 24 so as to provide multiple individual cinch points about which a cinch line may be secured in a manner as previously described. While each post 29 in FIG. 7 is shown depending downwardly from supporting member 24, as previously noted, any one or more of such posts 29 could extend outwardly from support member 24 in virtually any direction, provided only that surface 31 of support member 24, which lies opposite and adjacent each of the respective posts 29, remains free from obstruction so as to allow a cinch line to pass therearound in a manner as previously described herein.

It will be appreciated that multi-point cinch cleat 23 may be constructed of any desired length, provided intermediate supporting legs 26 are appropriately spaced and interposed along the length thereof, so as to provide adequate support for one or more cinch knots to be tied thereto. Thus, as can be readily seen, with the use of my multi-point cinch cleat 23, multiple knots may be tied to a single cleat in a comfortably spaced relation, without any overlapping thereof. Consequently, each knot may be separately adjusted as necessary, without the need untying multiple knots that have been stacked one atop another, as commonly experienced with conventional cleats.

By way of example, as shown in FIG. 8, a pair of multi-point cinch cleats 23a and 23b are mounted on opposing supporting surfaces 32 and 33, such as the side panels of a truck bed. As shown in FIG. 8, a single continuum of cinching line 34 may be either unidirectionally or bidirectionally cinched at knot point 35 on cleat 23a in accordance with the present invention, such that line segment 36 extending across to cleat 23b constitutes a tension line incapable of outward longitudinal movement relative to knot 35. At cleat 23b, a similar unidirectional cinching knot may be tied at point 37 such that the same line segment 36 thereof also forms the tension line, and the opposite line segment 38 from knot 37 constitutes the take-up line therefor.

Similarly, at an adjacent cinch point 39 on cleat 23b, a similar unidirectional knot may be tied in accordance with the present invention, such that line segment 40 extending outwardly therefrom to cleat 23a constitutes a tension line, and the coextensive line segment 38 extending between adjacent cinch points 37 and 39 constitutes the take-up line for each.

Thus, line segment 38 essentially forms a "take-up loop" which may be utilized to take up slack in either or both line segments 36 and 40, separately and individually, at will, thereby tightening the same. As is readily apparent, cinching between any desired cinch points on cleats 23a and 23b may be continued using unidirectional and/or bidirectional cinching knots, as desired, to effectively secure the placement of any cargo or load.

Other and additional embodiments of my improved cinch cleat are shown in FIGS. 9 and 10, wherein cleat 41 is constructed in a form of a continuous loop 42 having an open interior 43 and at least one post 44 extending outwardly from the outer loop structure 42. Securing means, such as an integral screw member 45 is secured to the outer continuum of loop member 42 for mounting the cleat to an appropriate supporting surface. Again, this member 45 could even constitute a stake member to be driven into a ground surface for purposes of cinching a line thereto.

As can be seen from FIGS. 9 and 10, cleat 41 may take on a number of configurations, provided that free end 46 of each post 44 remains unobstructed and accessible, and surface 47 of loop member 42, which lies opposite and adjacent each post 44, remains free from obstruction to allow passage of a cinch line therearound. Moreover, it is noted that, similar to cleats 1 and 23 previously described, the continuum of loop 42 extends outwardly from post 44 in opposite directions. In the present embodiment, post 44 is disposed along the continuum of loop member 42 at a point intermediate the closure of loop member 42 near junction 48 with mounting means 45.

With a cleat construction as shown in FIG. 9 or 10, it can be seen that loop member 42 always extends outwardly from each post 44 in opposite directions a sufficient distance so as to adequately support a cinch line that is past therearound. For best cinching results, it is preferable that loop member 42 extend outwardly from post 44 a distance which approaches or exceeds the cross-sectional dimension of the cinch line to be used therewith. Also, as shown in FIG. 9, it is preferable that the portion of loop member 42 adjacent post 44 extend outwardly therefrom in opposite directions along a line that is generally perpendicular to the axis of post 44, to provide maximum support to the cinch line.

As still another alternative embodiment, shown in FIG. 11 is cinch cleat 49, which is constructed highly similar to cleat 41 of FIGS. 9 and 10, with the exception that the mounting means has been reconfigured to a releasable hook member 50, rather than a more permanent mounting means, as screw 45. As is readily apparent, cleat 49 has the added advantage of being highly versatile, in that it can be transferred and mounted on any surface capable of being engaged by hook 50. Once again, as previously described, either unidirectional or bidirectional cinching knots may be readily tied on one or more of the above cleats. With the added flexibility of being readily removable, as with cleat 49, potential applications for which such a cleat and cinching method may be used are virtually limitless.

From the above, it is evident that my improved cleat and cinching method greatly enhances the versatility and ease by which any given load may be secured using only a single continuous length of line. My improved cleat and cinching method may be readily utilized for unidirectional or bidirectional cinching, and may be constructed at a low cost with multiple cinch points to avoid the cumbersome task of having to untie multiple stacked knots to access a lower one.

In addition to the above, my improved cinch cleat does not require the traditional outwardly extending arms found on most conventional cleats. Therefore, potential injury and/or likelihood of such arms snagging or damaging cargo is greatly reduced. All of the above benefits may be realized at a greatly reduced manufacturing price over more recently developed cam buckle and ratchet strap cinching mechanisms. Since there are no multiple lines, or bulky, complicated buckles, upon completion of use, one need only wind up the full length of cinch line for handy storage. If removable cinch cleats are used, such cleats may be readily removed and easily stored in a convenient location separate from the cinch line, thereby avoiding unnecessary tangling of the line and cleats. will, of course, be understood that various changes may be made in the form, details, arrangement and proportions of the parts without departing from the scope of the invention which comprises the matter shown and described herein and set forth in the appended claims.

What is claimed is:

1. A cinch cleat comprising:
   (a) a rigid elongated support member having opposite ends;
   (b) at least one post member mounted on said support member between said ends and extending outwardly therefrom to receive a line therearound;
   (c) said post member having a free end;
   (d) means for mounting said support member upon a supporting surface with said elongated support member and said post member in spaced relation to said supporting surface; and
   (e) said free end of said post member extending outwardly from said support member a distance of about one-half the distance between said support member and said supporting surface.

2. The cinch cleat defined in claim 1, wherein each of said opposite ends of said support member are adapted to be mounted upon a supporting surface with intermediate portions of the support member in spaced relation thereto.

3. The cinch cleat defined in claim 1, wherein said post member and at least a portion of said support member are opposite and adjacent each other.

4. The cinch cleat defined in claim 3, wherein said portion of said post member that is opposite and adjacent to said support member is a free surface.

5. The cinch cleat defined in claim 1, wherein a plurality of said post members are mounted to said support member in spaced relation along the length thereof.

6. The cinch cleat defined in claim 1, wherein said means for mounting includes a hook member carried by said support member.

7. The cinch cleat defined in claim 1, wherein said support member has a continuous shape with an open interior.

8. The cinch cleat defined in claim 1, wherein said support member has a generally arcuate shape adjacent said post.

9. The cinch cleat defined in claim 1, wherein said support member has a generally triangular shape, and said post extends generally within the confines of said triangular shape.

10. The cinch cleat defined in claim 1, and a line to be passed around said support and post member and having a minimum cross-sectional dimension, said free end of said post being spaced from said mounting surface a distance greater than the cross-sectional dimension of said line.

11. The cinch cleat defined in claim 1, wherein portions of said support member adjacent said post extend generally perpendicular to said post.

12. A method of securing a line to an anchor, comprising the steps of:
   (a) providing an anchor which is mounted to a supporting surface and includes an elongated support spaced from the supporting surface, the support having joined thereto at least one post spaced from said supporting surface and having a free end extending outwardly therefrom in non-aligned relation and having opposite sides;
   (b) passing the line around one side of the post to thereby provide first and second segments of the line;
   (c) passing the first segment toward and around the support; and
   (d) then passing the first segment around the opposite side of the post in such a manner and to such an extent as to wedge the line against the post and support at the juncture of the post with the support.

13. The method defined in claim 12, wherein the first segment passes over the second segment.

14. The method defined in claim 12, wherein the first segment passes over the second segment after it passes toward and around the support.

15. The method defined in claim 12, wherein the first segment passes over the second segment prior to passing around the opposite side of the post.

16. The method defined in claim 12, wherein the first segment passes over itself prior to passing around the opposite side of the post.

17. The method defined in claim 12, and
   (e) thereafter passing the first segment back toward and around the support.

18. The method defined in claim 12, and
   (e) thereafter passing the first segment over itself and back toward and around the support.

19. The method defined in claim 12, and
   (e) passing the second segment toward and around the support; and
   (f) then passing the second segment around the opposite side of the post, to thereby lock each of the segments in fixed position against any longitudinal shifting relative to the support or the post.

20. The method defined in claim 12, and
   (e) passing the second segment toward and around the support and the first segment, and
   (f) then passing the second segment around the opposite side of the post, to thereby lock each of the segments in fixed position against any longitudinal shifting relative to the support and post.

21. The method defined in claim 12, and
   (e) passing the first segment back toward and around the support; and
   (f) passing the second segment toward and around the support and around the opposite side of the post, and then back toward and around the support to thereby lock each of the segments in fixed position against any longitudinal shifting of the line relative to the support and the post.

22. The method defined in claim 12, and (e) passing the second segment simultaneously over the first mentioned segment and the support; and (f) then passing the second segment around the opposite side of the post, to thereby lock each of the segments in fixed position against any longitudinal shifting of either segment relative to the support and post.

23. The method defined in claim 12, wherein the first segment constitutes a tension line connected to a load, and the second segment constitutes a take-up line for tightening the first segment.

24. The method defined in claim 12, and providing the post of the anchor with a free end.

25. The method defined in claim 12, and cantilevering the post at one end to the support with the other end of the post being free.

26. The method defined in claim 12, and providing the elongated support with a continuous shape with an open interior.

27. The method defined in claim 12, providing the elongated support with a generally circular shape with an open interior.

28. The method defined in claim 12, and providing the elongated support with a generally triangular shape having an open interior.

29. A method of securing a line to an anchor, comprising the steps of:

(a) providing an anchor which is mounted in spaced relation upon a supporting surface and includes an elongated support and at least one post with opposite sides and a free end extending outwardly therefrom in non-aligned relation;

(b) passing the line around one side of the post to thereby provide first and second segments of the line;

(c) passing the first segment toward and around the support; and (d) then passing the first segment over the free end of the post and then around the opposite side of the post in such a manner and to such an extent as to wedge the line against the post and support, thereby preventing the strand from longitudinal movement in at least one direction.

30. The method defined in claim 29, and (e) passing the second segment toward and around the support; and (f) then passing the second segment around the opposite side of the post, to thereby lock each of the segments in fixed position against longitudinal movement relative to the support and post.

31. A cinch cleat comprising:

(a) a rigid elongated support member having opposite ends;

(b) a plurality of post members mounted on said support member between said ends and extending outwardly therefrom to receive a line therearound;

(c) each of said members having a free end; and (d) means for mounting said support member upon a supporting surface with said elongated support member and said post members being in spaced relation to said supporting surface.

* * * * *

UNITED STATES PATENT AND TRADEMARK OFFICE
CERTIFICATE OF CORRECTION

PATENT NO. : 6,409,230 B1
DATED : June 25, 2002
INVENTOR(S) : Guy J. Entenmann

It is certified that error appears in the above-identified patent and that said Letters Patent is hereby corrected as shown below:

<u>Column 1,</u>
Line 35, change "treating" to -- threading --.

<u>Column 9,</u>
Line 59, insert -- for -- immediately ahead of "untying".

<u>Column 11,</u>
Line 26, insert -- It -- immediately ahead of "will".
Line 26, begin new paragraph starting with -- It will, of course,... --.

Signed and Sealed this

Seventeenth Day of December, 2002

JAMES E. ROGAN
*Director of the United States Patent and Trademark Office*